(12) United States Patent
Lin

(10) Patent No.: US 7,045,919 B1
(45) Date of Patent: May 16, 2006

(54) ROTOR ASSEMBLY

(75) Inventor: Chih-Yuan Lin, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/117,003

(22) Filed: Apr. 29, 2005

(51) Int. Cl.
*H02K 7/00* (2006.01)

(52) U.S. Cl. .................. 310/67 R; 310/89
(58) Field of Classification Search .......... 310/89, 310/67 R, 261, 254
See application file for complete search history.

(56) References Cited

U.S. PATENT DOCUMENTS

| | | | |
|---|---|---|---|
| 4,554,473 A * | 11/1985 | Muller | 310/67 R |
| 4,698,542 A * | 10/1987 | Muller | 310/67 R |
| RE34,268 E * | 6/1993 | Muller | 310/67 R |
| 5,663,604 A * | 9/1997 | Takahashi | 310/91 |
| 5,793,135 A * | 8/1998 | Suzuki et al. | 310/90 |
| 6,271,611 B1 * | 8/2001 | Taniguchi et al. | 310/89 |
| 2005/0116556 A1 * | 6/2005 | Huang et al. | 310/58 |

* cited by examiner

*Primary Examiner*—Thanh Lam

(57) ABSTRACT

A rotor assembly includes a hub and a hood. The hub provides a shoulder wall extending the center thereof and a hub wall connecting the shoulder wall. The hood provides a top wall and a lateral wall connecting the top wall. The shoulder wall of the hub has a fixing part disposed next to the end thereof and the top wall of the hood provides a through hole fitting with the fixing part such that the hub mounts to the outer surface of the hood.

1 Claim, 3 Drawing Sheets

ROTOR ASSEMBLY

BACKGROUND OF THE INVENTION

Field of the Invention

The present invention is related to a rotor assembly and particularly to a rotor assembly with reinforced binding force.

Referring to FIG. 1, a conventional fan device at least includes a fan frame 11 and a hub 12. The fan frame 11 has an inner support base 111 and the support base 111 has an axial barrel 112 with a bearing 113 inside. A stator 13 fits with the axial barrel 112 such that the stator 13 is disposed on the support base 111. A hood 14 is inside the hub 12 and the hood 14 has a top wall 141 with a lateral wall 142 extending downward from the top wall 141. Hence, the hub 12 covers the outer surface of the hood 14 with a closed wall 121 closely adjacent to the top wall 142 and a hub wall 122 closely adjacent to the lateral wall. Further, binding agent is coated between the hub 12 and the hood 14. A rotor 15 is annularly attached to the inner surface of lateral wall 142 of the hood 14. The outer surface of the hub 12 is formed with a plurality of fan blades 17 with a spindle 16 connecting with the hood 14 at an end thereof and penetrating the bearing 113 at the other end thereof such that the hub 12 and the hood 14 pivotally connects with the support base 111 to allow the stator 13 and the rotor 15 constituting magnetic connection to each other.

However, problem of the preceding prior art resides in that phase change from magnetization created by the stator 13 and the rotor 14 actuates the hub 12 and the hood 14 to rotate such that the fan blades 17 is rotated to move fluid too and, under this circumference, magnetic force created during the stator 13 and the rotor 15 running turns into heat physically to reduce binding force of the binding agent. As a result, the binding agent between the hub 12 and the hood 14 losses the binding force completely after a period of time and it results in the hub 12 separating from the hood 14 and rotating without being synchronous with the hood 14 such that the overall operation efficiency of the fan motor is affected and more power is required in order to maintain a consistent rotational speed of the hub 12 with the hood 14. It is obvious that the conventional fan device not only consumes more power but also degrades cooling effect.

SUMMARY OF THE INVENTION

An object of the present invention is to provide a rotor assembly in which a fixing part provided on the hub corresponds to and engages with a through hole provided at the hood to enhance engagement between the hub and the hood after the hub being attached to the outer surface of the hood.

Another object of the present invention is to provide a rotor assembly in which the hood has a top wall, which exposes and is capable of transmitting heat, to cause heat exchange for helping heat dissipation.

In order to achieve the preceding objects, a rotor assembly according to the present invention includes a hub and a hood. The hub provides a shoulder wall extending the center thereof and a hub wall connecting the shoulder wall. The hood provides a top wall and a lateral wall connecting the top wall. The shoulder wall of the hub has a fixing part disposed next to the end thereof and the top wall of the hood provides a through hole fitting with the fixing part such that the hub mounts to the outer surface of the hood.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
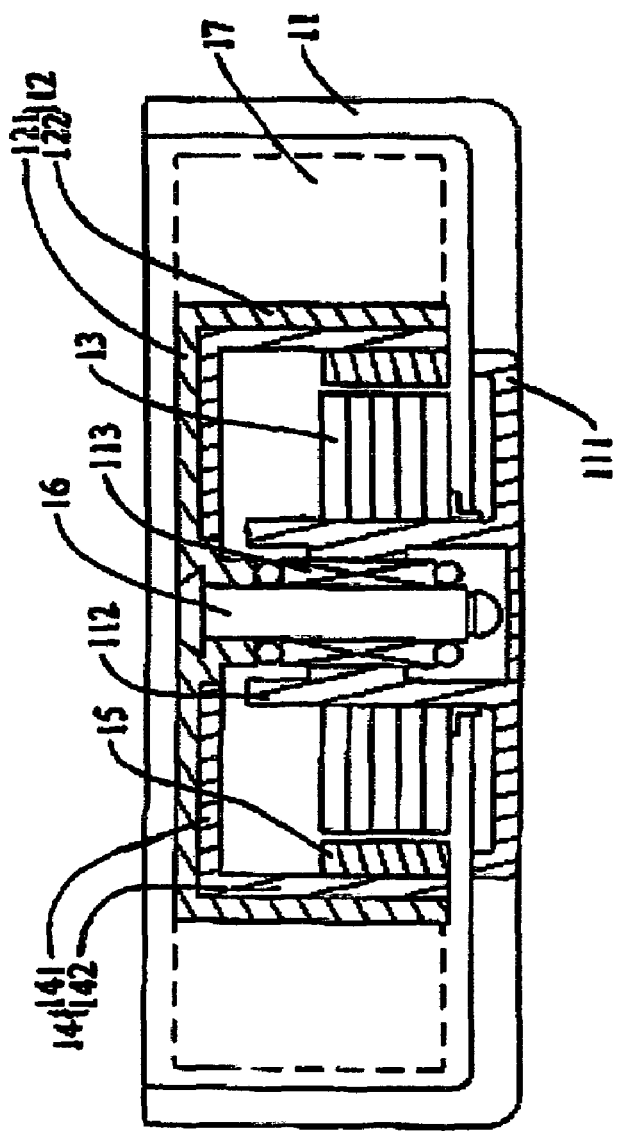
FIG. 1 is a sectional view of the conventional rotor device in a fan motor.
Figure 2:
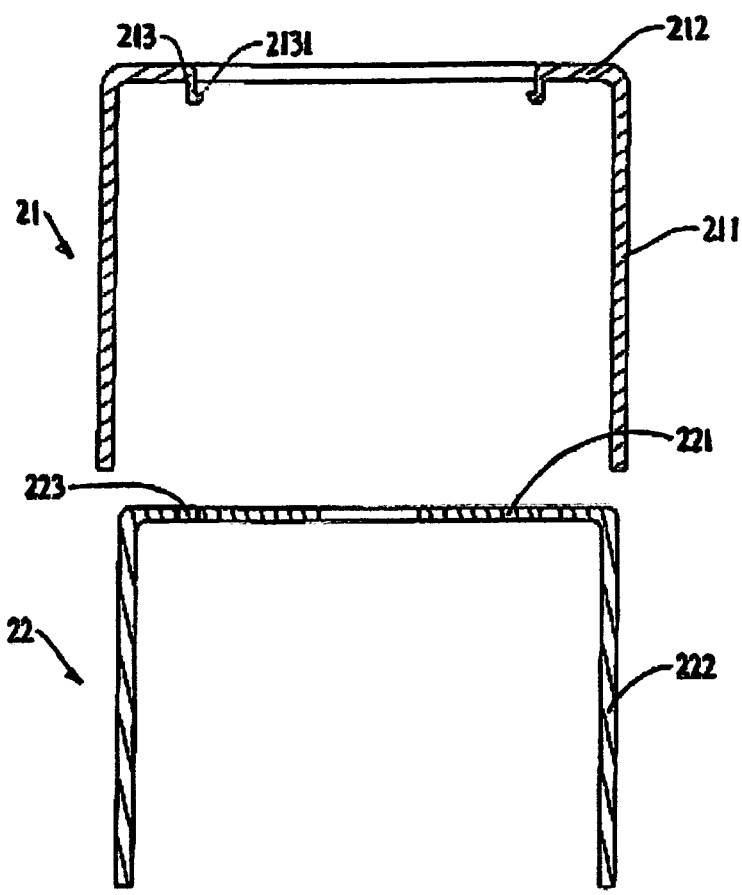
FIG. 2 is a sectional view illustrating a rotor assembly according to the present invention being in a state of being disassembled.
Figure 3:
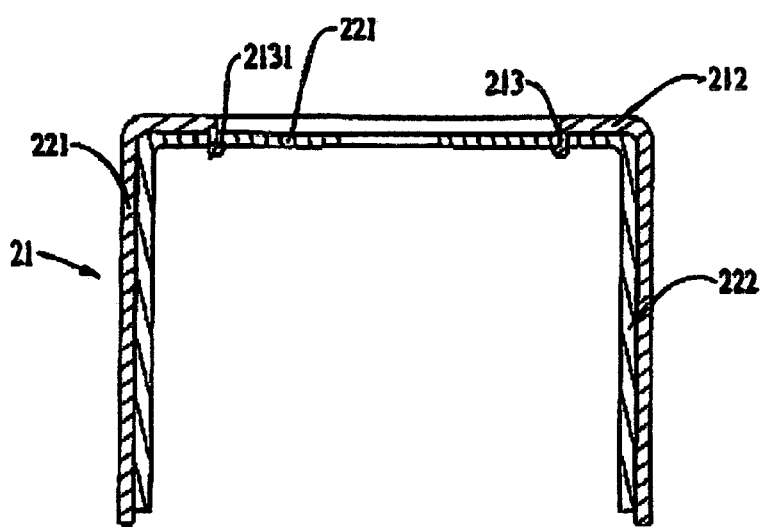
FIG. 3 is a sectional view illustrating the rotor of the present invention being in a state of being assembled.

Referring to FIGS. 2 and 3, a preferred embodiment of a rotor assembly according to the present invention comprises a hub 21 and a hood 22. The hub 21 has a hub wall 211 with a shoulder wall 212 extending from an end of the hub wall 211 toward the center thereof. The shoulder wall 212 has at least a fixing part 213 extending downward with an inverted hook 2131.

The hood 22 has a top wall 221 and a lateral wall 222 joined to the top wall 221 and extending downward. The top wall 221 has at least a through hole 223 corresponding to the fixing part 213. Once the rotor assembly has been set up, the shoulder wall 212 of the hub 21 is disposed next to the top wall 221 of the hood 22 and the fixing part 213 passes through the through hole 222 with the inverted hook 2131 engaging with the hub wall 211 such that the hub wall 211 tightly fits with the lateral wall 222 of the hood 22 and part of the top wall 221, which is not covered by the shoulder wall 212, leaves exposed. Due to being uncovered by the shoulder wall 12, adhesives can be added between the hub 21 and the hood 22 to secure the hub 21 to the hub 21.

Further, it is preferable that the hub 21 is made of plastics and the hood 22 and made of metal or plastics.

Figure 4:
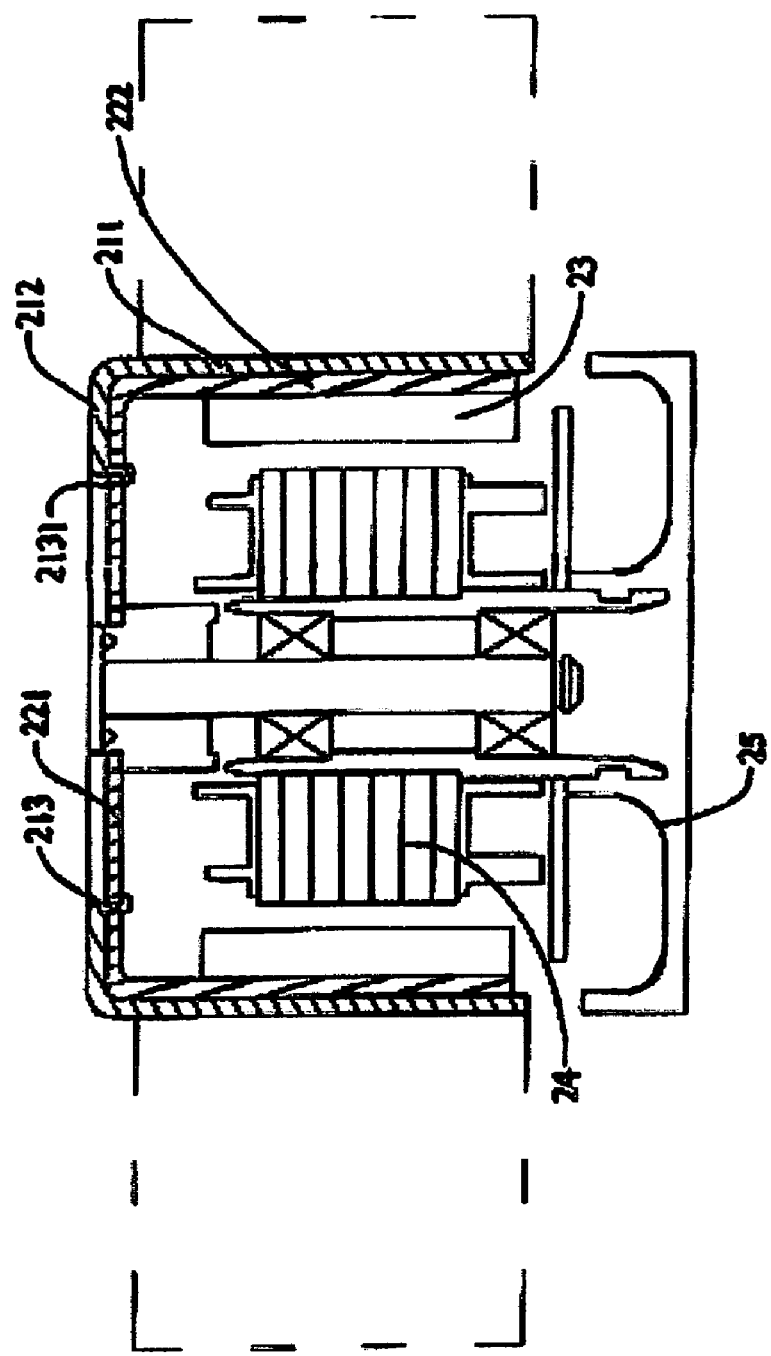
FIG. 4 is a sectional view illustrating the rotor assembly of the present invention being mounted to a fan motor.

Referring to FIG. 4 in company with FIGS. 2 and 3, in case of the rotor assembly of the present invention being mounted to a fan motor, it can be seen that the rotor 23 of the fan motor is disposed at the inner side of the hood 22 and the stator 24 of the fan motor is mounted to a motor base 25 such that it results in the rotor 23 magnetically connecting with the stator 24. Once the rotor 23 and the stator 24 are magnetized to actuate the hub 21 and the hood 22 rotating, a rotational force is created to move fluid. Thus, rotation between the rotor 23 and the stator 24 generates physical change, i.e., the magnetic force turns into heat and the heat rises temperature of the fluid in the hub 21 and the hood 22 via heat transfer. The temperature risen fluid moves due to rotation of the hub 21 and the heat created by running of the rotor 23 and the stator 24 is transmitted with the hub 21. Owing to the fixing part 213 passing through and fitting with the through hole 223 of the hood 22 and the inverted hook 2131 engaging with inner side of the top wall 221 on the hub 22, a joining force is capable of producing against the rotational force for preventing from decreasing binding force of adhesives so as to overcome deficiency of the hub 22 separating from the hood, which resides in the prior art. Further, the top wall 221 of the hood 22 exposes so that heat transmitted with the hood 22 is able to perform heat exchange with the outside air and it is helpful for cooling the rotor and the stator 24 and enhancing life spans and running efficiencies thereof.

While the invention has been described with referencing to preferred embodiments thereof, it is to be understood that modifications or variations may be easily made without departing from the spirit of this invention, which is defined by the appended claims.

What is claimed is:

1. A rotor assembly, comprising:
   a hub with a U-shaped cross section;
   a hood with a U-shaped cross section, the outer periphery thereof being joined to the inner surface of the hub;
   a rotor, being attached to an inner lateral wall surface of the hood;
   a motor base, supporting a motor shaft;
   a stator, being mounted to the base and surrounding the motor shaft;
   characterized in that the top of the hub provides an large opening to form a hollow space with at least a fixing part extending downward from the top thereof at the edge of the opening and the lower end of the fixing part is a hook end; the hood provides a central hole at the top thereof for being penetrated by the motor shaft and has at least a through hole corresponding to the fixing part at the top thereof for the fixing part passing through and holding the top of the hood with the hook end.

* * * * *